United States Patent
Hakuchoh et al.

(10) Patent No.: US 7,480,824 B2
(45) Date of Patent: Jan. 20, 2009

(54) METHOD FOR CONTROLLING STARTING OPERATION OF UNIT AND EXECUTING SELF-CHECKING TEST

(75) Inventors: Tatsushi Hakuchoh, Ksusatsu (JP); Tomoaki Kimura, Fujisawa (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 11/064,048

(22) Filed: Feb. 23, 2005

(65) Prior Publication Data

US 2005/0166093 A1 Jul. 28, 2005

Related U.S. Application Data

(63) Continuation of application No. 09/900,577, filed on Jul. 6, 2001, now Pat. No. 6,915,453.

(30) Foreign Application Priority Data

Jul. 7, 2000 (JP) ............................. 2000-206526

(51) Int. Cl.
*G06F 11/00* (2006.01)
(52) U.S. Cl. ............................. 714/30; 714/32; 714/41
(58) Field of Classification Search .................. 714/30, 714/27, 41, 32; 369/53.12, 53.13, 53.17, 369/53.37, 53.42, 53.35
See application file for complete search history.

(56) References Cited

U.S. PATENT DOCUMENTS

| | | | |
|---|---|---|---|
| 4,497,057 A | 1/1985 | Kato et al. | |
| 4,677,586 A | 6/1987 | Magar et al. | |
| 5,204,912 A * | 4/1993 | Schimanski | 382/147 |
| 5,440,724 A | 8/1995 | Boothroyd et al. | |
| 5,453,992 A | 9/1995 | Whetsel | |
| 5,537,537 A | 7/1996 | Fujikawa et al. | |
| 5,602,989 A * | 2/1997 | Aria | 714/43 |
| 5,692,217 A * | 11/1997 | Maeda | 710/5 |
| 5,835,700 A | 11/1998 | Carbonneau et al. | |
| 6,169,413 B1 * | 1/2001 | Paek et al. | 324/760 |
| 6,212,258 B1 | 4/2001 | Bella et al. | |
| 6,249,880 B1 * | 6/2001 | Shelly et al. | 714/34 |
| 6,324,657 B1 | 11/2001 | Fister et al. | |
| 6,523,111 B1 * | 2/2003 | Smolski | 713/2 |
| 6,697,962 B1 | 2/2004 | McCrory et al. | |

OTHER PUBLICATIONS

Wilson, Tracy and Tyson, Jeff; Howstuffworks "How Computer Keyboars Work"; http://computer.nowstuffworks.com/keyboard5.htm; viewed Mar. 13, 2008.*

* cited by examiner

*Primary Examiner*—Joshua A Lohn
(74) *Attorney, Agent, or Firm*—Dillon & Yudell LLP

(57) ABSTRACT

When a testing system is connected to a debug port of a tape drive unit or a SCSI bus, a self-checking test for a fabricating process is executed. When the testing system is not connected, the self-checking test for normal operation is executed. And in a test of a single card, a motor test and an MR head resistance test, which are tests of a mechanical structure portion, are omitted. In addition, in a box assembling process, the test contents are suppressed to a minimum prior to adjustments to the, tape head. Furthermore, in a test program, the status of a flag or an indication corresponding to a test executed in a next step is changed.

16 Claims, 6 Drawing Sheets

METHOD FOR CONTROLLING STARTING OPERATION OF UNIT AND EXECUTING SELF-CHECKING TEST

PRIORITY CLAIM

This application is continuation of U.S. patent application Ser. No. 09/900,577, filed on Jul. 6, 2001 now U.S. Pat. No. 6,915,453, and entitled "Method for Controlling Starting Operation of Unit and Executing Self-Checking Test.

BACKGROUND OF THE INVENTION

1. Technical Field

The present invention relates to a method for controlling starting operation of a unit, a method for executing a self-checking test of a unit, a control board, a device, and a checking system which are suitable for fabricating a wide variety of units.

2. Description of the Related Art

A great variety of devices now include a mechanical part, having moving parts, and a circuit section (circuit board) for driving the moving parts. Examples include a tape drive unit, a hard-disk unit, a printer, and other similar units. After power is applied to the unit at start up, these units enter a usable state after self-checking tests, such as initialization and test of the circuit section, operational test of the structural portion, and other tests have been executed. Such self-checking tests are executed based on a program stored in the read-only memory (ROM) of the circuit section.

In the process of fabricating the aforementioned units, predetermined tests are also given at predetermined points in the course of the fabricating process. The predetermined tests include, for example, a test of a single component and a test of a unit made up of a plurality of components (e.g., a test of a single circuit board and a test of a circuit board and a mechanical part combined with each other, respectively) and further include a test of a finished product.

It is possible to execute these tests by use of a dedicated test program from an external testing system after the completion of a single circuit board. It is also possible to execute the tests from a program stored in the circuit board itself (e.g., in the ROM of the circuit board).

The aforementioned self-checking test is normally executed during user operation of a unit in a finished-product state (hereinafter referred to as "normal operating mode"), and the tests employed in the course of the fabricating process will, if stored in ROM, represent unnecessary testing content that is not useful when the product is completed. If there is unnecessary test content, the tests will necessarily take time, resulting in a reduction in efficiency.

The present invention has been achieved in view of the aforementioned points. Accordingly, it is a primary object of the present invention to provide a method for controlling starting operation of a unit, a method for executing a self-checking test of a unit, a control board, a device, and a checking system which are capable of enhancing production efficiency in the fabricating process.

SUMMARY OF THE INVENTION

To solve the aforementioned problems, a dedicated program for executing a test during the fabricating process can be prepared and stored in a circuit board.

In this method, however, it is necessary to prepare multiple types of programs in accordance with each step of executing a test, complicating maintenance. In addition, after predetermined tests and processes are completed, it is necessary to rewrite the test mode program to accommodate the normal operating mode. If rewriting is forgotten, finished products with the pre-completion test mode program will be shipped.

Another potential solution involves storing the normal operating mode program and the test mode program in the circuit board with a dip switch for varying the mode. If the dip switch is set to test mode in the fabricating process, the test mode program is executed when the unit is activated, and predetermined tests can be executed.

In the dip switch method, it is possible to easily change modes by switching the dip switch. However, if after completion of all tests and processes, switching the dip switch to the normal operating mode is forgotten and the unit is shipped, the test program will be executed in booting the unit after shipment. In addition, the dip switch is required merely for the purpose of executing tests in the fabricating process and therefore represents needless expense.

Instead of employing the aforementioned dip switch, a setting flag for executing the normal operating mode program and a setting flag for executing the test mode program can also be stored in an arbitrary region within non-volatile memory provided in the circuit board. This region will hereinafter be referred to as a vital product data (VPD) region. In the fabricating process, the test mode program can be executed at start up by switching the setting.

Such a method allows prevention of shipment of finished products set to boot in test mode because it is possible to assemble into a sequence of tests a process that sets a flag to the normal operating mode. However, it is necessary to boot a program and expend time in order to vary the setting of the flag. This method has not effectively achieved the object of the present invention, i.e., enhancing production efficiency in the fabricating process.

To attain the aforementioned object of the present invention, there is provided a method for controlling starting operation of a unit having at least a circuit portion, comprising the steps of:

executing a first self-checking test when a connection between an outside device and the circuit portion is not recognized; and executing a second self-checking test including at least part of the first self-checking test, when the connection between the outside device and the circuit portion is recognized.

The method of controlling starting operation of a unit is effective when applied to units in which a self-checking test of each part such as a circuit, a mechanical part, or another system component is executed at start up. The "unit" used herein does not always need to be a unit in a finished-product state. It means a single circuit section, a combination of a circuit section and a mechanical part, or any other suitable configuration.

Where an outside device (to be employed in the fabricating process) has not been connected, the unit will start up, and the program stored in the circuit section will boot, in a finished-product state (ready for shipment). The first self-checking test will then be executed, and each part of the unit will be checked.

On the other hand, when making a predetermined check or an adjustment in the process of fabricating such a unit, or when analyzing failure, the self-checking test is also executed at the time when the unit has been started up and a process based on the program stored in the circuit section has been started. In such a case, the circuit section of the unit is connected with an outside device that is employed in a check, adjustment, or failure analysis. The unit in this stage is started up and recognizes that the aforementioned outside device has been connected. The second self-checking test, which includes only a portion of the tests in the first self-checking test (to be executed in a finished-product state) is executed. For instance, in the case where a check of only the circuit portion (only a board) is made in the fabricating process, sections other than the circuit section (board) may not have been assembled and may not require testing. This allows that a self-checking test of only the circuit section (board) may be adequate. Likewise, in the self-checking test prior to making an adjustment to the mechanical part of a unit in the fabricating process, self-checking tests of only the minimum elements (circuits or elements) required for operating the mechanical part maybe adequate. There may be no necessity for executing self-checking tests of the entire circuit section. Thus, in the fabricating process, the minimum of the self-checking tests required should be executed when a program is booted, whereby the time required for the self-checking tests can be shortened. After the required minimum self-checking tests are executed, other predetermined operations, such as initialization of the circuit section in the fabricating process (e.g., writing of a serial number, etc.), adjustments to each part, setting of controls, and other operations are executed.

It is preferable that, at the time of recognizing a connection to an outside device, a predetermined command be transmitted from the unit and whether there is input of a control command output from the outside device in response to the predetermined command be detected. The predetermined command and the control command may be input or output between the outside device and the circuit portion through an interface.

In accordance with the present invention, there is also provided a method for executing a self-checking test of a unit equipped with a mechanical part for performing a predetermined operation and a control board for controlling the mechanical part, comprising:

a first step of executing a test common to a first self-checking test, which is executed when the unit is in a finished-product state, and a second self-checking test, which is executed when the unit is in an unfinished-product state;

a second step of judging whether or not the unit is in the finished-product state; and a third step of continuing either the first self-checking test, which is executed when the unit is in a finished-product state, or the second self-checking test, which is executed when the unit is in an unfinished-product state, based on the result of judgment in the second step.

The second self-checking test, which is executed when the unit is in an unfinished-product state, is characterized by further comprising a fourth step of overwriting a flag-setting of a program in accordance with a next self-checking test. Therefore, at the time of executing the next self-checking test, a predetermined process is executed according to the set flag. For example, test during the process of fabricating a unit requires that the first through the third steps of the second self-checking test, which is executed when the unit is in an unfinished-product state, are executed. In the fourth step, the set flag is overwritten so that in the next test, the self-checking test in a finished-product state is executed. If done in this manner, the self-checking test in a finished-product state is executed when this unit is started up after shipment. In addition, where a plurality of processes in fabricating a unit exists, execution of a self-checking test in an unfinished state may overwrite a set flag in accordance with the next self-checking test.

Thus, the flag overwriting process is executed as part of the self-checking test, which is executed when a unit is in an unfinished-product state, and human errors, such as forgetting to change a setting, can be avoided.

In accordance with the present invention, a control board is also provided, which is combined with a mechanical part for performing a predetermined operation. It stores a program for controlling the mechanical part, which is characterized by including a process for transmitting a predetermined command to the outside device through an interface and a process of selecting and executing a specific self-checking test program from several kinds of self-checking test programs in accordance with a control command input from the outside device through the interface in response to the predetermined command. Furthermore, the program is characterized in that a specific self-checking test program may be selected based on whether or not a predetermined flag has been set by a control command output from the outside device. When the flag has been set, the specific self-checking test program may be selected based on the type of flag.

In addition, by employing an input-output port as an interface for debugging a program, there is no need to provide a special interface for output of said predetermined command and input of a control command. An interface other than the input-output port for debugging may also be utilized.

In accordance with the present invention, there is also provided a unit comprising a mechanical part for performing a predetermined operation and a control section for controlling the mechanical part, in which the control section comprises:

storage means for storing several kinds of self-checking test programs, which are executed at the time of starting an operation;

notification means for informing an outside device at predetermined time, that a command is acceptable;

selection means for selecting a self-checking test program, which is executed from among multiple types of self-checking test programs, based on whether or not there is a control command input from the outside device in response to the notification by the notification means; and execution means for executing the self-checking test programs selected by the selection means.

The present invention applies to a variety of drives, including a tape drive unit, a hard-disk drive unit, a compact-disk drive unit, a printer, a video cassette deck, a video camera, a copying unit, a facsimile unit, and many other, similar devices.

In accordance with the present invention, there is provided a system for checking a product, which is equipped with a moving part and a control section for controlling the moving part, in a process of fabricating the product, in which a command for shifting the checking system to a predetermined self-checking test is output with the checking system connected to the product equipped with at least the control section, when it is notified by the product that a command is acceptable.

And in this checking system, a predetermined check is made for the product given a predetermined self-checking test in response to the command output from the checking system.

BRIEF DESCRIPTION OF THE DRAWINGS

FIG. 8 is a diagram showing a tape head to which fine adjustments are made in the box assembling process.

DETAILED DESCRIPTION OF THE PREFERRED EMBODIMENT

The present invention will hereinafter be described in detail, based on an embodiment shown in the accompanying drawings.

Figure 1:
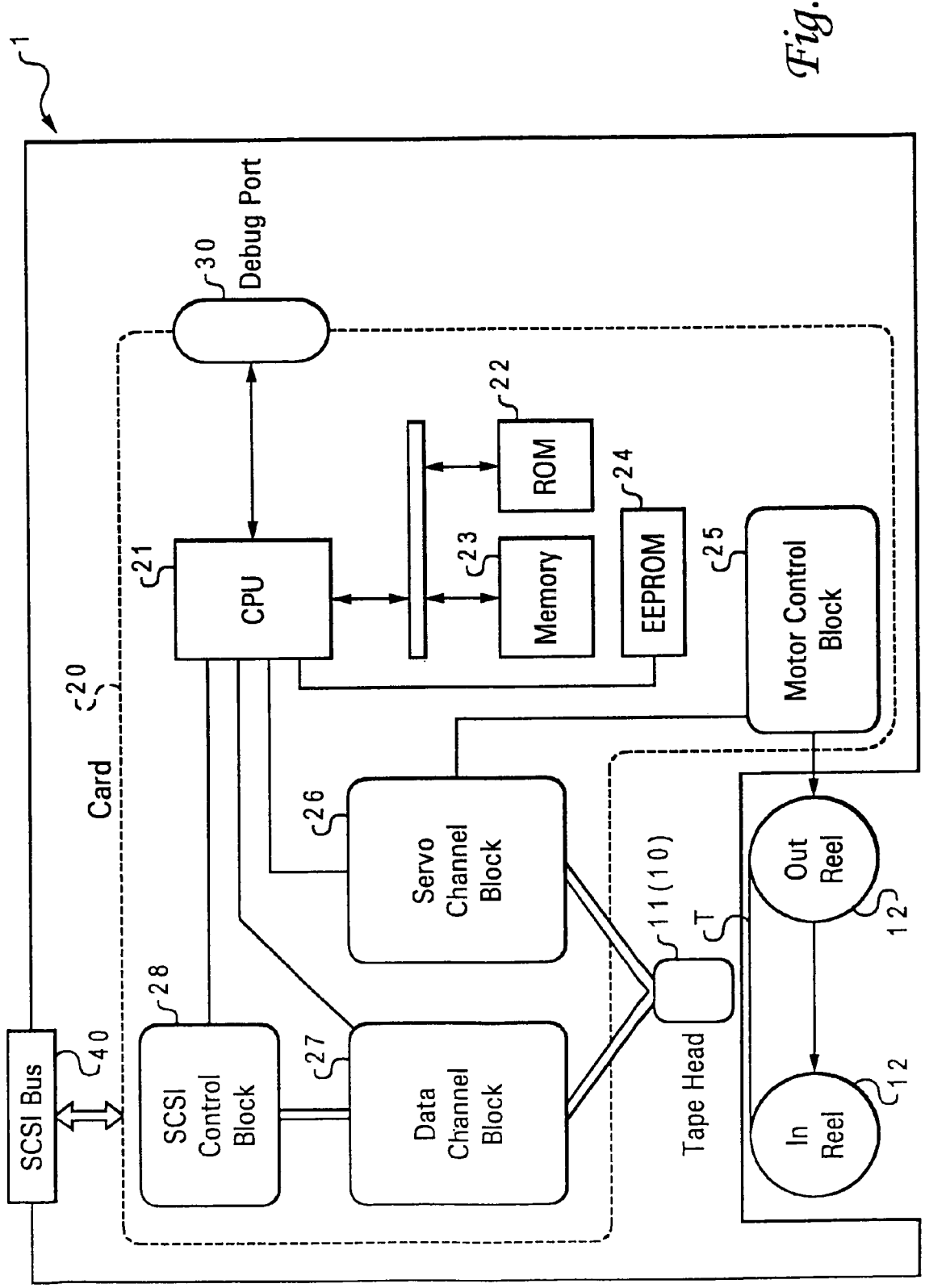
FIG. 1 is a block diagram showing the configuration of a tape drive unit, which becomes a testing object in a method for controlling starting operation of a unit and for executing a self-checking test of a unit, according to an embodiment of the present invention.

FIG. 1 is a diagram for explaining a tape drive unit that becomes a testing object in a method for controlling starting operation of a unit and executing a self-checking test of a unit, according to an embodiment of the present invention. In the drawing, reference numeral 1 denotes a tape drive unit, which is a unit, an item of equipment, or a product. Reference numeral 10 denotes a mechanical part (moving part) of the tape drive unit 1. Reference numeral 20 denotes a circuit board (card), which is configured by the circuit section, the control board, and the control section of the tape drive unit 1.

As the mechanical part 10, there is a tape head 11, which abuts the tape T of a tape cartridge (storage medium) mounted in the tape drive unit 1 to perform read and write operations on the tape T, a head drive mechanism (not shown) for moving the tape T away from or toward this tape head 11, a motor (not shown) for driving a pair of reels (in-reel and out-reel) 12 for winding up the tape T, an ink jet mechanism (not shown) for discharging the tape cartridge, and other related equipment.

The circuit board 20 is equipped with a CPU (selection means, execution means) 21 for controlling the unit. It also contains a read-only memory (ROM) 22 as storage means for storing a predetermined program for reading or writing data from or to the tape T of the tape cartridge in the tape drive unit 1 and a memory 23 such as a random access memory (RAM). An electrically erasable and programmable read-only memory (EEPROM) 24, which is non-volatile memory, is also present for storing information required for booting the system. The system also contains a motor control block 25 for controlling a motor (not shown) and a servo channel block 26 for controlling the tape head 11. System components involved in the transfer of data include a data channel block 27 for controlling reading and writing of data at the tape head 11 and generating data in a predetermined form and a small computer system interface (SCSI) control block 28 for controlling input and output between the data to be handled by the data channel block 27 and an outside device.

The circuit board 20 is equipped with an input-output port or debug port (interface, notification means) 30 that is employed at the time of debugging the computer program. This input-output port 30 is connected directly to the CPU 21 and is an interface capable of bi-directional data transfer, such as a serial port or a parallel port.

The tape drive unit 1 is connected with other pieces of equipment and is equipped with a SCSI bus (interface, notification means) 40 for transmitting or receiving data through the SCSI control block 28 of the circuit board 20.

Figure 2:
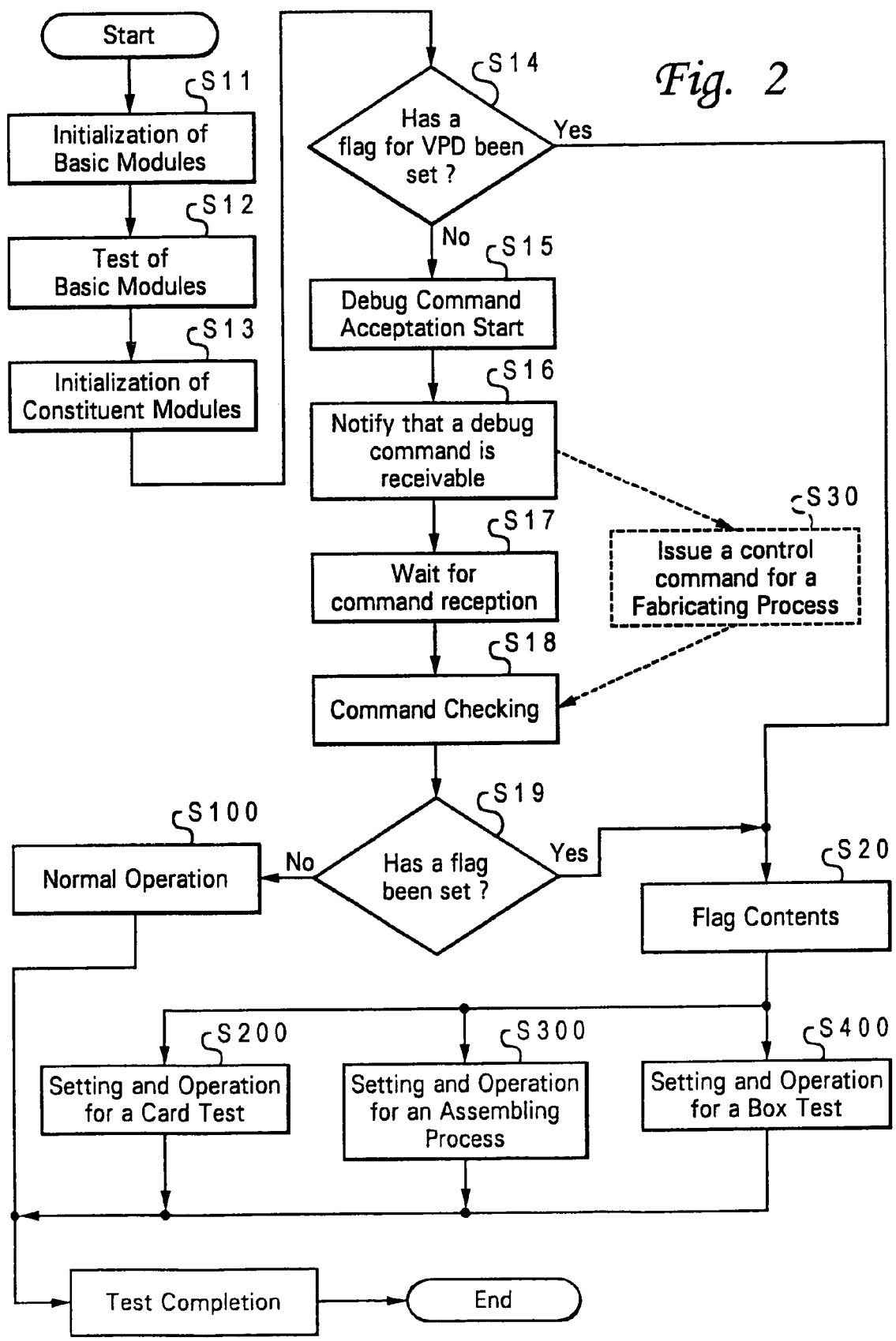
FIG. 2 is a diagram showing the flow of a self-checking testing method for the tape drive unit.

The programs stored in the ROM 22 include a program for executing a self-checking test at the time of booting the system (or the time of applying power to the system). FIG. 2 shows a high-level flow of the self-checking test program.

As shown in this drawing, if the system is booted, the basic modules on the circuit board 20 are initialized, and after they have been set to an operable state (step S11), an operational test for the basic modules is carried out (step S12). The basic modules used herein include the CPU 21, the ROM 22, and the memory 23. In this embodiment, the setting of the CPU 21 is performed during the initialization of basic modules in step S11. Following this, the test of the basic modules in step S12 is executed as follows. Sensors (not shown) mounted on the circuit board 20 are checked to confirm whether or not the voltage being applied to the tape drive unit 1 (circuit board 20) and the temperature of the unit 1 are within allowable ranges, whether or not the program written to the ROM 22 is correct, whether or not data can be correctly read or written from or to the memory 23, and other tests of similar type.

Next, the constituent modules of the circuit board 20 are initialized and set to an operable state (step S13). The constituent modules used herein are the tape head 11, the EEPROM 24, the motor control block 25, the servo channel block 26, the data channel block 27, the SCSI control block 28, and the input-output port 30. More specifically, in the initialization of the constituent modules in step S13, confirmation of whether each register of the constituent modules is in a usable state, confirmation of whether connector lines for the SCSI bus 40 have been connected correctly, and confirmation of whether a predetermined interrupt process is correctly performed when an interrupt signal is input to the CPU 21, are performed after the program stored in the ROM 22 is expanded to the memory 23.

The next step S14 checks whether or not a flag has been set to a vital product data (VPD) region in the EEPROM 24. When the flag has been set, the process skips to step S20, which will be described later. When the flag has not been set to the VPD region in the EEPROM 24, the input-output port 30 is subsequently set to an operable state so that it can accept a debug command (step S15). The input-output port 30 then signals, by a predetermined command, such as a predetermined character string, that it can accept the debug command from the CPU 21 (step S16).

After this, the input-output port 30 waits for external command input for a predetermined time (e.g., about 1 sec) (step S17).

Although described in detail later, nothing is normally connected to the input-output port 30 when the tape drive unit 1 is in a finished-product state (after shipment). There is also no external command input.

On the other hand, in the test step during fabrication of the tape drive unit 1, testing systems (external equipment, checking systems) 200, 300, and 400 (to be described later) are connected to the input-output port 30 or the SCSI bus 40. When receiving a character string output from the input-output port 30 or SCSI bus 40, the testing systems 200, 300, and 400 provide control commands for shifting to predetermined test modes, which differ for each step (step S30). The control commands are received from the input-output port 30 to the tape drive unit 1 (circuit board 20). If the character string of the control command from an outside device is detected during step S17, the circuit board 20 receives a flag representing a command to enter the test mode through an interrupt routine and temporarily stores the flag in the memory 23.

Efficiency favors executing both the self-checking test for normal operating mode in a finished-product state and the common, preliminary tests at each step during fabrication, while waiting for command input, in step S17.

Subsequently, after checking the input command (step S18), whether or not a flag to enter a test mode has been set (step S19) is detected.

Here, when the flag has not been set, there is no control command from the outside systems (testing systems 200, 300, and 400), and no testing systems 200, 300, and 400 are connected to the input-output ports 30. That is, the tape drive unit 1 is judged to be in a finished-product state, and a test for a normal operating mode (normal operation) is executed (step S100).

On the other hand, when the flag has been set, the contents are analyzed (step S20). According to the result, the process in this embodiment shifts to a card test mode, a box assembling process mode, or a box test mode and carries out settings and operations corresponding to the appropriate mode (steps S200, S300, and S400).

A description of the test mode at each mode branched in the above-mentioned steps S19 and S20 will be given now.

Figure 3:
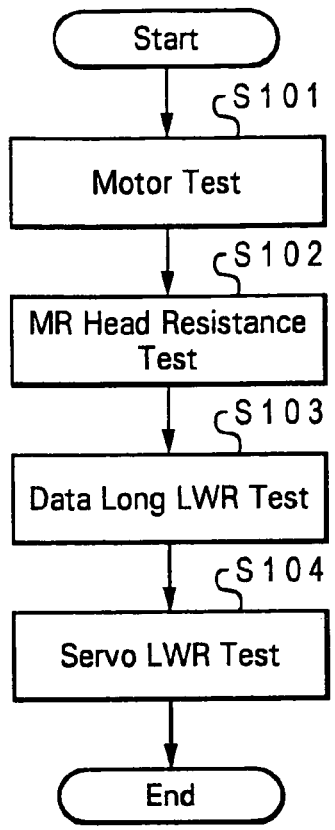
FIG. 3 is a diagram showing the flow of the process of a self-checking testing method in a normal operating mode.

Shown in FIG. 3 is flow of self-checking tests at the normal operating mode in the aforementioned step S100.

In step S101, the test of the motor (not shown) of the mechanical part 10 is executed. In this test, the motor is actually operated. Then, whether it operates correctly, and whether each sensor controlling the motor operates correctly is confirmed. Note that this motor test takes more than 60 seconds.

In step S102, it is confirmed that the magnetic resistance value of a magneto-resistive head, which is the tape head ii, is within a predetermined range.

In the data long LWR test in step S103 it is confirmed, within the data channel block 27, that data can be correctly transferred to the side of the tape head 11.

In step S104, in the servo channel block 26 and motor control block 25, a pseudo test for rotating the motor (servo LWR test) is executed by confirming that servo patterns can be correctly transferred and interpreted.

With the aforementioned steps, the self-checking test of the normal operating mode ends, whereby the tape drive unit 1 achieves an operable state.

A sequence of self-checking tests in steps S11 to S13, S17, and step S100 (first self-checking test) are executed when the unit 1 is in a finished-product state (e.g., at start up). This sequence of self-checking tests is called a power-on self-test (POST).

Figure 4:
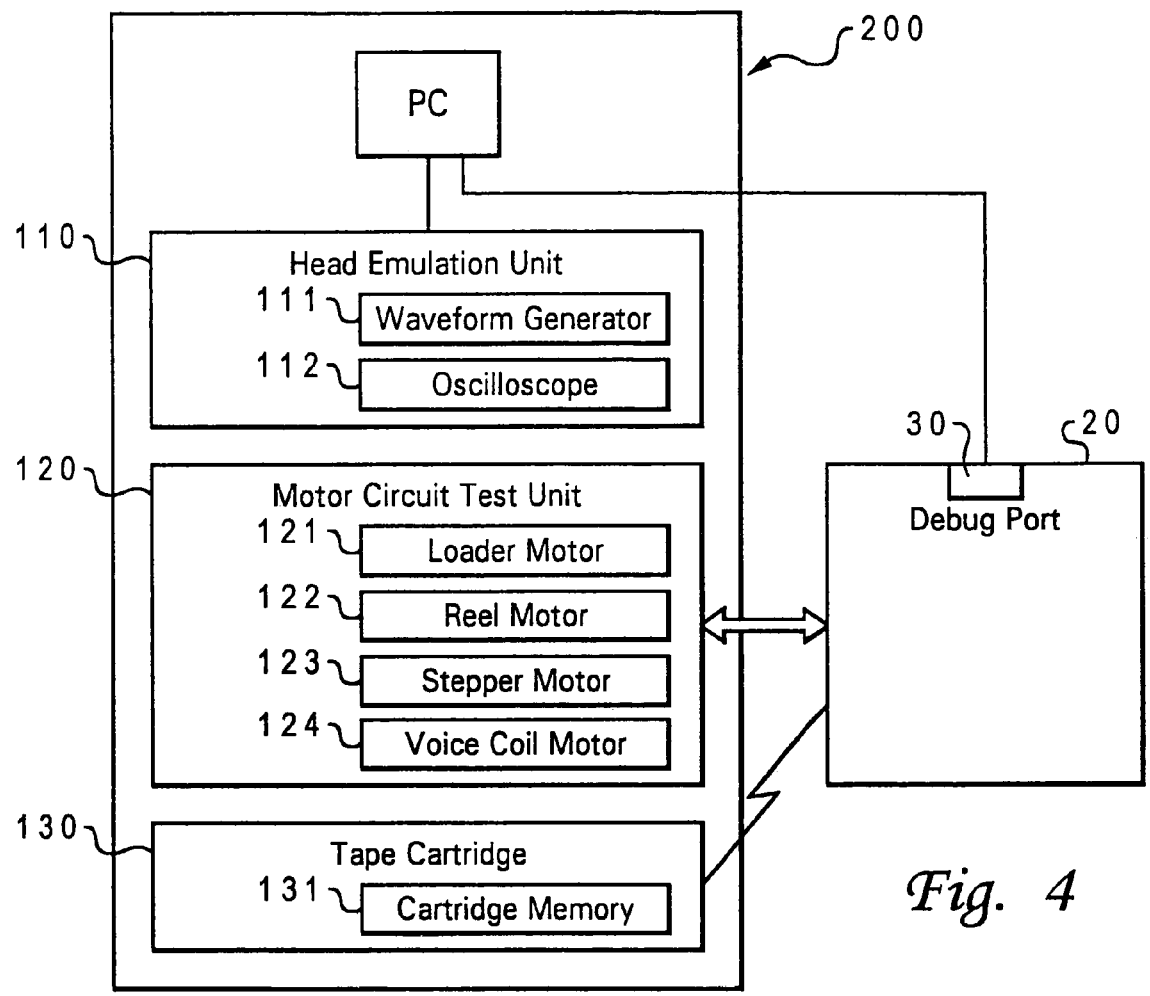
FIG. 4 is a diagram showing the configuration of a testing system for executing a test to a single circuit board.

FIG. 4 shows the testing system 200 when a test is given to the single circuit board 20 during the process of fabricating the tape drive unit 1. This testing system 200 connects a connector with the input-output port 30 of the circuit board 20 so that data can be transferred there between.

In the circuit board 20, with the input-output port 30 connected with the testing system 200, a flag has not been set to the VPD region in the EEPROM 24, so the process advances from step S14 in FIG. 2 to step S15. In the following step S16, if it is determined that a debug command is receivable through the input-output port 30, a card-test control command is issued in step S30 from the testing system. The control command is sent from the input-output port 30 to the circuit board 20, whereby the process shifts to the test of the single circuit board 20 in step S200.

Figure 5:
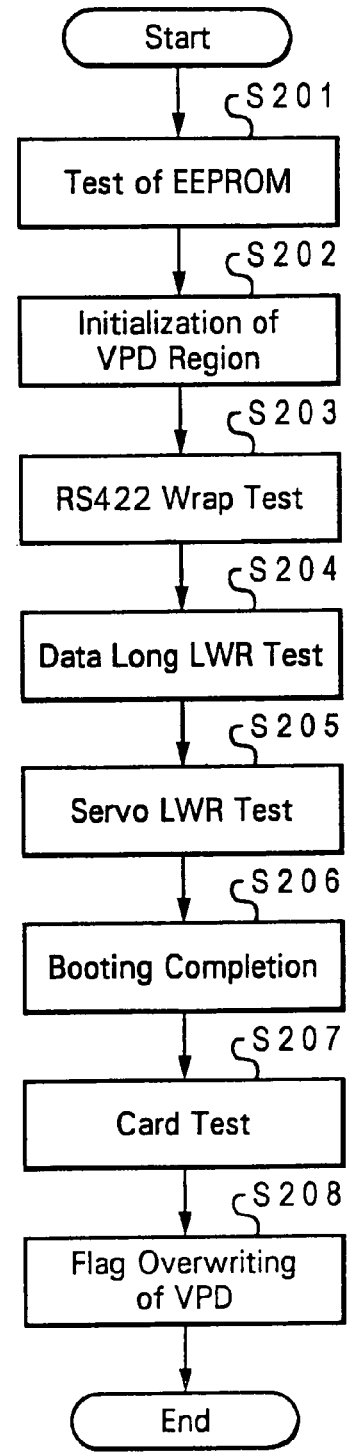
FIG. 5 is a diagram showing the flow of the process of testing the single circuit board.

FIG. 5 specifically shows flow of the test (step S200) of the single circuit board 20 executed by the testing system 200.

In the single circuit board state 20, a flag has not been set to the VPD region in the EEPROM 24. Therefore, the EEPROM 24 is tested (step S201). The EEPROM 24 is non-volatile memory and therefore, no test is executed in the self-checking test in the normal operating mode. Thus, only the EEPROM test is executed at this time.

The VPD region is initialized next, so that information required for booting the system, is written (step S202). Also, the test (RS422 wrap test) of an interface (RS422), which is employed when multiple tape drive units 1 are combined into a library unit, is executed (step S203).

Thereafter, as with steps S103 and S104 in the normal operating mode, the data long LWE test and the servo LWR test are executed (steps S204, S205). The booting of the circuit board 20 in the card test process is then complete (step S206).

In step S207 the circuit board 20 is actually tested by a predetermined program in the testing system 200. In this embodiment, the operation of each of the individual functional blocks constituting the circuit board 20 is checked by testing system 200 shown in FIG. 4 through use of a head emulation unit 110, a motor circuit test unit 120, a tape cartridge 130, and other equipment. In the head emulation unit 110, the data channel block 27, and other related parts are tested in a manner that simulates data being read out or written in with the tape head 11 (which has not been assembled at this point of time). This is accomplished through use of a waveform generator 111 and an oscilloscope 112. Also, in the motor circuit test unit 120, a loader motor 121 of the same type as the mechanical part 10 (which has not been assembled at this point of time), a reel motor 122, a stepper motor 123, and a voice coil motor 124 are actually connected to the motor control block 25, and a circuit test is executed. In the tape cartridge 130, instead of employing a tape cartridge that will be added later, a memory cartridge 131, in which predetermined data has previously been stored at a predetermined position, is employed to determine whether or not data can be read out or written in.

Settings, such as a serial number, specific to the individual circuit boards 20, are performed to track the shipment quality of the circuit board 20. Because settings for the box assembling process are made at the end of the test of the circuit board 20, a flag for the VPD region in the EEPROM 24 is written (step S208).

In the above-mentioned way, in the test of the single circuit board 20 in an unfinished-product state, a sequence of self-checking tests (second power-on self-test) in steps S11 to S13, step S17, and step S200 are executed, and part of the power-on self-test (POST) in the normal operating mode is executed. Also, in the test of this single circuit board 20, in steps S201, S202, S207, and S208, other predetermined operations different from the power-on self-test (POST) in the normal operating mode are executed.

In such a test of the single circuit board 20, the motor test (step S101) and the MR head resistance test (step S102), which are executed by actually operating the mechanical part 10, are not executed. This is different from the normal operating mode. Although it takes, in the normal operating mode, about 39.1 sec to complete booting (step S11 to step S100), the test of the single circuit board 20 takes about 39.1 sec to complete booting from step S11 to step S206. This result saves time.

Figure 6:
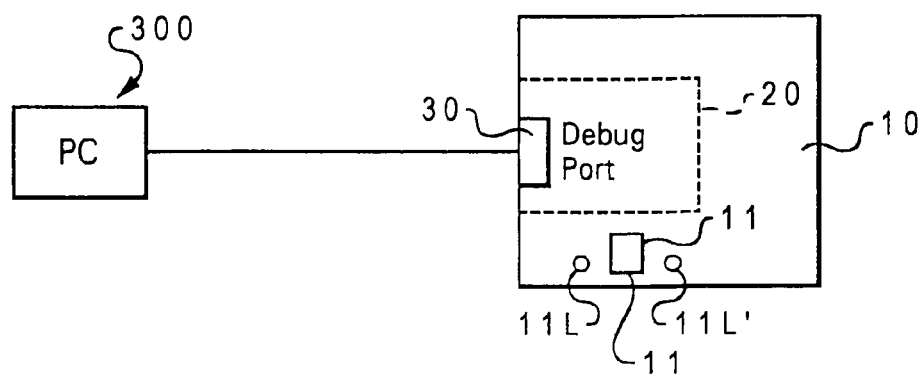
FIG. 6 is a diagram showing the configuration of a testing system employed in a box assembling process.

FIG. 6 shows the testing system 300 when, in the process of fabricating the tape drive unit 1, a test is executed with the mechanical part 1 mounted on the circuit board 20. This testing system 300 connects a connector to the input-output port 30 of the circuit board 20, allowing for the transfer of data between them.

In the circuit board 20 with the input-output port 30 connected with the testing system 300, the process skips from step S14 of FIG. 2 to step S20, because a flag has been written to the VPD region in the EEPROM 24 in step S208. The process shifts to the box-assembling process test in step S300, in compliance with the written flag.

Figure 7:
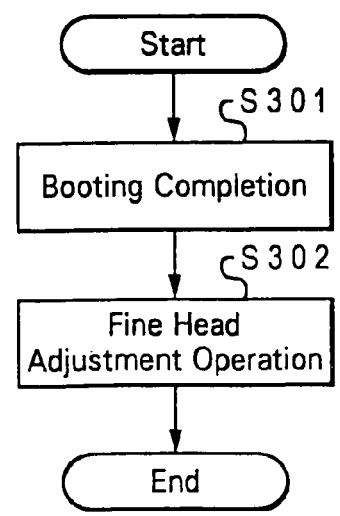
FIG. 7 is a diagram showing a test of a box assembling process and the flow of a fine adjustment.

FIG. 7 shows the flow of the test at the box-assembling process in greater detail.

The box assembling process involves a test (step S300) at the stage of making fine adjustments to the tape head 11 with the mechanical part 10 assembled to the circuit board 20. Booting is completed (step S301) after, in steps S19 and S20 of FIG. 2, the flag for the VPD region in the EEPROM 24 is checked. The checking in this process can be made within about 25.9 sec until completion of booting, by executing the minimum test from step S11 to step S13.

Figure 8A:
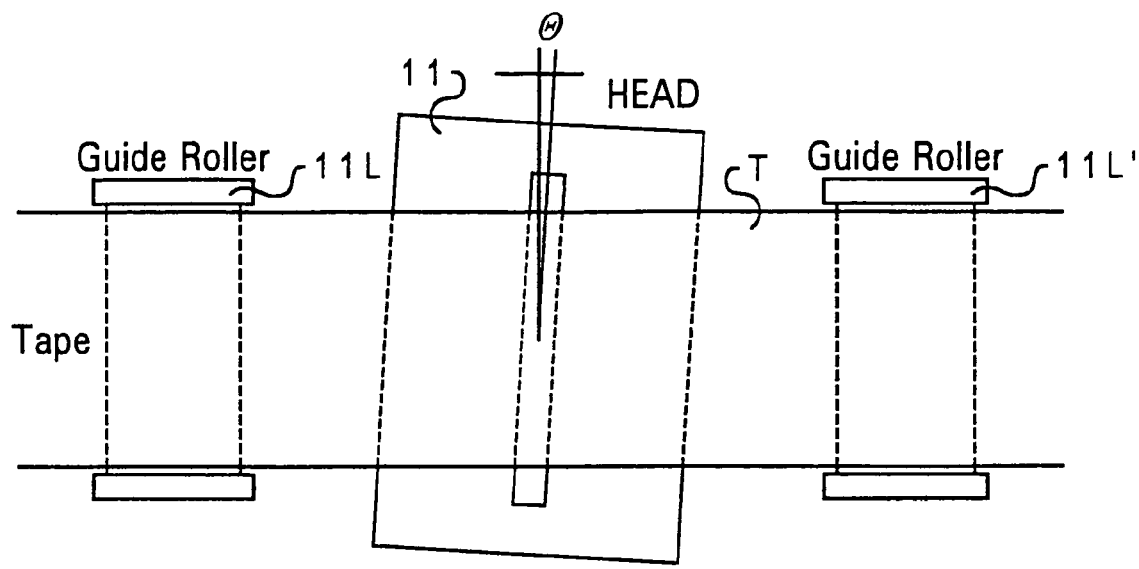
FIG. 8A is a front view showing the tape head and FIG. 8B is a plan view of the tape head.
Figure 8B:
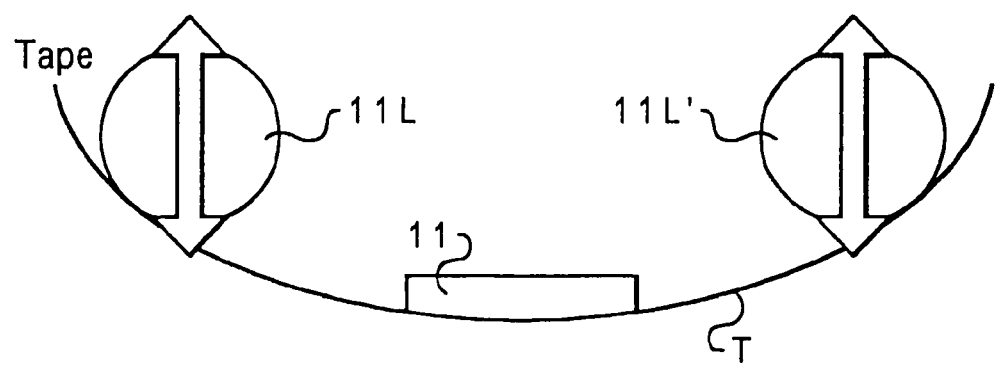

The above-mentioned manner allows that, in the tape drive unit 1 in its unfinished-product state, the minimum self-checking test (second power-on self-test) in steps S11 to S13 and step S300 is executed at the time of starting operation, and then fine adjustments to the tape head 11 are made (step S302). Adjustments can include an adjustment of the tape head 11 of the mechanical part 10 to an offset angle q (see FIG. 8A) relative to a direction perpendicular to the running direction of the tape T, an adjustment to a stroke (see FIG. 8B) in the direction where guide rollers 11L, 11L' are moved toward and away from the tape T, and other similar adjustments.

Figure 9:
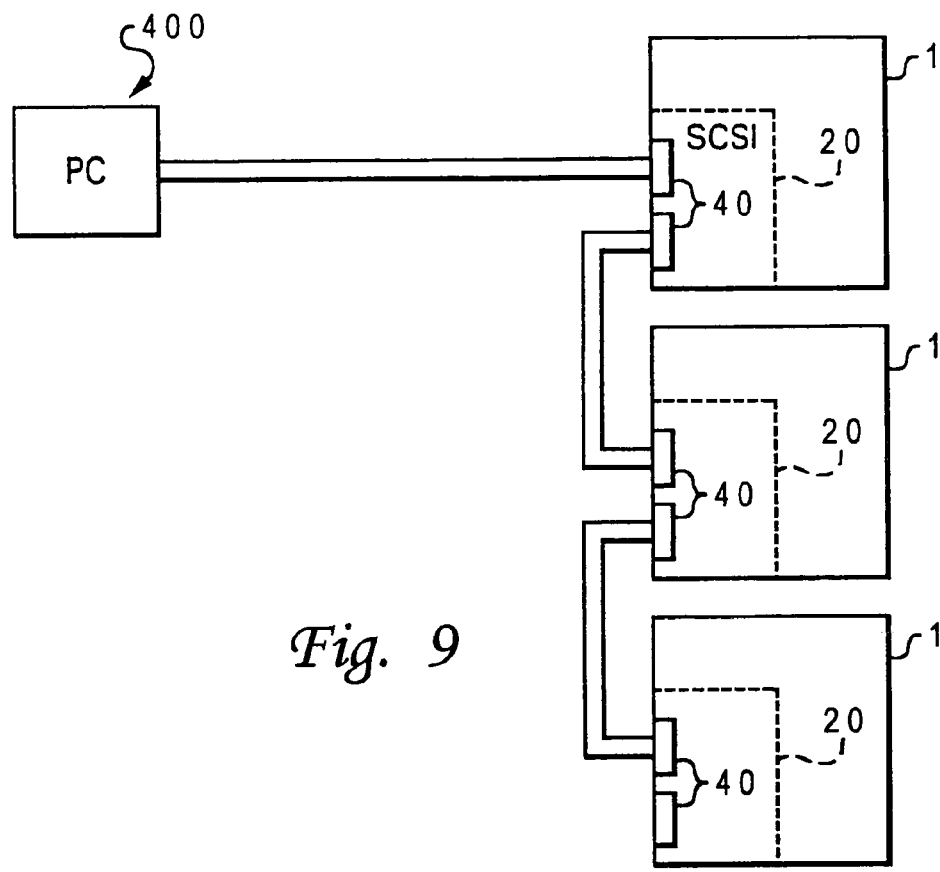
FIG. 9 is a diagram showing a tape drive unit connected to a testing system which is employed in a box test.

As shown in FIG. 9, the testing system 400 is employed in the box test that is executed as an inspection before shipment, with the tape drive unit 1 finished in the fabricating process. The testing system 400 connects a connector to the SCSI bus 40 so that data is transferred and received there between. Efficiency favors parallel test execution, with a multiple of tape drive units 1 connected in a daisy-chain manner.

Figure 10:
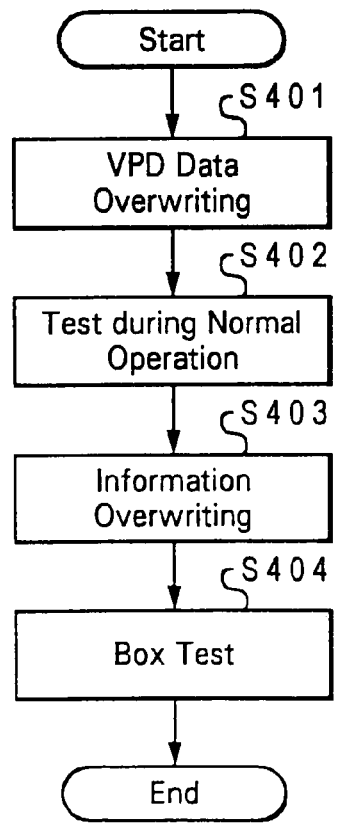
FIG. 10 is a diagram showing flow of a box testing process.

FIG. 10 shows flow of the box test in detail.

In this box test, since a flag has not been overwritten in the above-mentioned box assembling process (process of making fine adjustments to the tape head 11), the tape drive unit 1 is booted with the same setting as the box assembling process, and step S11 of FIG. 2 to step S14, and step S20 are performed. In the setting and operation for the box test in step S400, the data (flag) for the VPD region in the EEOROM 24 is overwritten to data for the normal operating mode by a SCSI command through the SCSI bus 40 (step S401).

The tape drive unit 1 is then restarted, and the same tests (POST) as those in normal operation are performed (step S402). That is, the initialization of the basic modules in step S11 of FIG. 2, the test of the basic modules in step 512, the initialization of the constituent modules in step S13, the test in step S17, and the tests in step S100 (the motor test in step S11 of FIG. 3, the MR head resistance test in step S102, the data long LWR test in step S103, and the servo LWR test in step S104) are performed in sequence.

Thereafter, the information for the VPD region in the EEPROM 24, such as a flag, a serial number, etc., is overwritten via a SCSI command, and the tape drive unit 1 is set to a shipment state (step S403).

After the setting, the box test is executed (step S404). In this embodiment, the tape drive unit 1 is actually started, and the test (POST) in the normal operating state is executed. Then, a tape media cartridge is actually loaded into the tape drive unit 1, and a command to read out or write data from or to the tape T is output through the SCSI bus 40. Whether data is correctly read out or written from or to the tape T loaded into the tape drive unit 1 is tested. After this test, the tape drive unit 1 is shipped as the finished product.

In the above-mentioned method of controlling starting operation of the tape drive unit 1 and method for executing a self-checking test, the motor test and the MR head resistance test, which are the test of the mechanical part 10, are omitted, particularly in the card test process in which the test of the single circuit board 20 is executed. In the box assembling process, the test contents are minimized prior to adjustments to the tape head 11. Thus, separate from the tests in the normal operating mode executed in a finished-product state, test menus corresponding to the various tests in an unfinished-product state in the fabrication process are made, and the time required for tests can be considerably reduced. In addition, test efficiency can be enhanced, and the efficiency of production of the tape drive unit I itself can be enhanced.

As the setting of a flag or other data bit, which corresponds to the tests in the subsequent process, is changed in the test program (steps S208, S401, and S403), human errors, such as forgetting a change in setting, can be avoided.

The testing systems 200, 300, and 400, which are employed in each step in the fabrication process, are connected to the input-output port 30 or SCSI bus 40, and through this input-output port 30, a control command to execute a test in the fabrication process is transferred or received. Therefore, if only the testing systems 200, 300, and 400 are connected, the process can be automatically shifted to a predetermined test mode. Because this input-output port 30 is originally equipped for debugging the computer program, it is unnecessary to provide an additional component for executing a test on the side of the tape drive unit 1.

In the aforementioned embodiment, a command can be transmitted from the side of the circuit board 20 (tape drive unit 1) to the outside at the time of executing the self-checking test in the normal operating mode or the self-checking test for the fabrication process. If so, whether or not a control command has been input from the external testing systems 200, 300, and 400 is then determined. That said, the present invention is not limited to such an application, but may employ other methods if one can determine whether the tape drive unit 1 is in a finished-product state, or whether the testing system 200, 300, or 400 has been connected.

While the input-output port 30 and the SCSI bus 40 are employed as the interface for connecting the testing system 200, 300, or 400, in any other types of interfaces, (a USB port) may be employed if they are interfaces that can perform hi-directional communication.

Although, in the aforementioned embodiment, three types of tests have been executed as the test for the fabricating process, one type of test, two types of tests, or four or more types of tests may be executed, and the test contents are not limited by the exemplary description provided herein.

In addition, products and devices to be tested are not limited to the tape drive unit 1 described in the aforementioned embodiment. The present invention is also applicable to products and devices in which the self-checking test is executed at the time of starting operation, for example, a wide variety of devices, such as hard-disk units, compact-disk drives, printers, video cassette decks, video cameras, copying units, facsimile units, and other similar devices.

As has been described above, the present invention can enhance not only the efficiency of the self-checking test but also the production efficiency of the unit or device itself.

What is claimed is:

1. A method for controlling a start-up operation of a device, wherein said device includes a memory and an input-output port, said method comprising:
   powering-on said device:
   examining said memory to determine if a flag had been set prior to said powering-on said device, wherein said flag indicates one test selected from a plurality of predetermined tests other than a normal operating mode test to be performed on said device;
     in response to determining said flag has been set, performing said one test without enabling said input-output port;
     in response to determining said flag has not been set, enabling said input-output port for accepting a command;
   determining if a command is received from said input-output port;
     in response to determining a command has been received from said input-output port, selecting a test among a plurality of predetermined tests other than said normal operating mode test to administer to said device, wherein said selected test is specified by said command; and
     in response to said selecting, administering said selected test to said device; and,
     in response to determining a command has not be received from said input-output port, performing said normal operating mode test of said device.

2. The method according to claim 1, wherein said receiving said command further includes receiving said command from a testing system coupled to said input-output port.

3. The method according to claim 1, further comprising: initializing said device.

4. The method as claimed in claim 1, wherein said one test comprises a setting and operation for a card test.

5. The method as claimed in claim 1, wherein said one test comprises a setting and operation for an assembling process test.

6. The method as claimed in claim 1, wherein said one test comprises a setting and operation for a box test.

7. A device, comprising:
   a processor;
   an input-output port coupled to said processor; and
   a computer-usable storage medium embodying computer program code, said computer-usable medium being coupled to said processor, said computer program code comprising instructions executable by said processor and configured for:
     after powering-on said device, examining said computer-usable storage medium to determine if a flag had been set prior to powering-on said device, wherein said flag indicates one test selected from a plurality of predetermined tests other than a normal operating mode test to be performed on said device;
     in response to determining said flag had been set, performing said one test without enabling said input-output port;
     in response to determining said flag had not been set, enabling said input-output port for accepting a command;
     determining if a command is received from said input-output port;
     in response to determining a command has been received from said input-output port, selecting a test among said plurality of predetermined tests other than said normal operating mode test to administer to said device, wherein said selected test is specified by said debug command; and
     in response to said selecting, administering said selected test to said device; and,
     in response to determining a command has not be received from said input-output port, performing said normal operating mode test of said device.

8. The device according to claim 7, wherein said instructions for receiving said command further includes receiving said command from a testing system coupled to said input-output port.

9. The device according to claim 7, further wherein said instructions are further configured for:
   initializing said device.

10. The method as claimed in claim 7, wherein said one test comprises a setting and operation for a card test.

11. The method as claimed in claim 7, wherein said one test comprises a setting and operation for an assembling process test.

12. The method as claimed in claim 7, wherein said one test comprises a setting and operation for a box test.

13. A computer-usable medium embodying computer program code for controlling a start-up operation of a device, wherein said device further includes a memory and an input-output port, said computer program code comprising computer-executable instructions configured for:
   after powering-on said device, examining said memory to determine if a flag had been set prior to powering-on said device, wherein said flag indicates one test selected from a plurality of a predetermined other than a normal operating mode test to be performed on said device;
     in response to determining said flag had been set, performing said one test without enabling said input-output port;
     in response to determining said flag had not been set, enabling said input-output port for accepting a command;
   determining if a command is received from said input-output;
     in response to determining a command has been received from said input-output port, selecting a test among said plurality of predetermined tests other than said normal operating mode test to administer to said device, wherein said selected test is specified by said command; and
     in response to said selecting, administering said selected test to said device; and,
     in response to determining a command has not be received from said input-output port, performing said normal operating mode test of said device.

14. The method as claimed in claim 13, wherein said one test comprises a setting and operation for a card test.

15. The method as claimed in claim 13, wherein said one test comprises a setting and operation for an assembling process test.

16. The method as claimed in claim 13, wherein said one test comprises a setting and operation for a box test.

* * * * *